March 23, 1926.
G. H. KOEHLER
UTENSIL HANDLE
Filed March 26, 1921
1,577,470
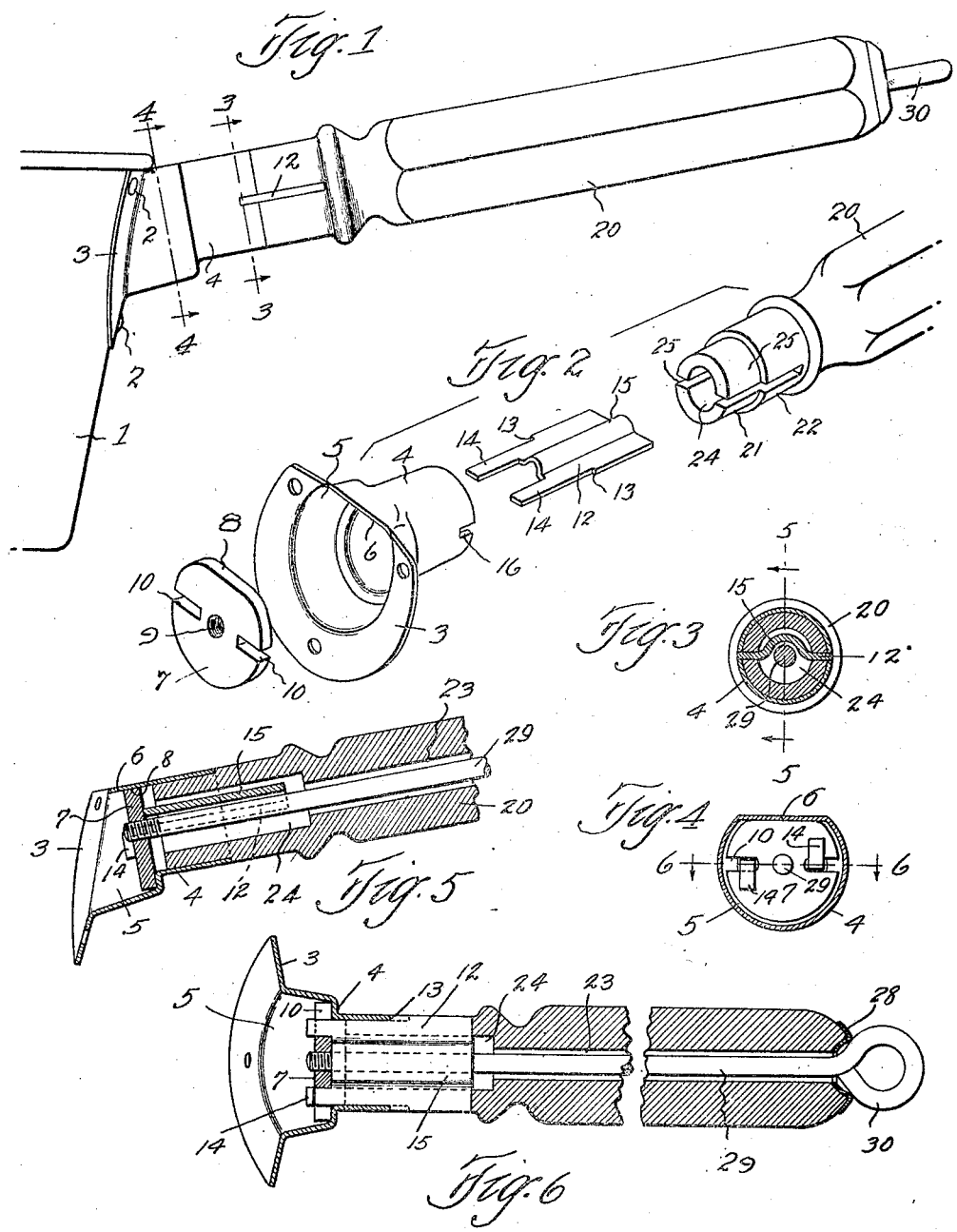
Inventor;
George H. Koehler
By Hull, Brock & West
Attys.

Patented Mar. 23, 1926.

1,577,470

UNITED STATES PATENT OFFICE.

GEORGE H. KOEHLER, OF CLEVELAND, OHIO, ASSIGNOR, BY MESNE ASSIGNMENTS, TO LANDERS, FRARY & CLARK, OF NEW BRITAIN, CONNECTICUT, A CORPORATION OF CONNECTICUT.

UTENSIL HANDLE.

Application filed March 26, 1921. Serial No. 455,728.

*To all whom it may concern:*

Be it known that I, GEORGE H. KOEHLER, a citizen of the United States, residing at Cleveland, in the county of Cuyahoga and State of Ohio, have invented a certain new and useful Improvement in Utensil Handles, of which the following is a full, clear, and exact description, reference being had to the accompanying drawings.

This invention relates to an improved handle for cooking utensils and the like, the objects being to provide a very strong, durable and neat appearing handle which, by reason of its unique construction, is especially convenient of attachment; is effectually held against turning with respect to the utensil, the nature of the connection between the grip portion of the handle (which may be of wood or other practically non-heat conducting material) and the utensil being such as will restrain said grip portion and the utensil against relative angular movement even though the shank of the grip portion be nearly burned away; and which, should the grip portion be so damaged, will permit of its being replaced in a particularly convenient and economical manner.

With these general objects, and others in view, the invention consists in the combinations, features, details of construction and arrangements of parts which will first be described in connection with the accompanying drawing and then more particularly pointed out.

In the drawing:

Fig. 1 is a fragmentary side elevation of a utensil and handle constructed in accordance with the invention; Fig. 2 is a perspective view of the elements of the handle in separated condition; Figs. 3 and 4 are sectional details on the respective lines 3—3 and 4—4 of Fig. 1, the views being taken as though looking in the direction indicated by the arrows associated with said lines; Fig. 5 is a section on the line 5—5 of Fig. 3; and Fig. 6 is a central horizontal section through the handle, the plane of section being indicated by the line 6—6 of Fig. 4.

Referring to the drawing, in the embodiment illustrated as an example, secured to the side of the vessel 1, as by rivets 2, is the base flange 3 of a ferrule 4, the outer end of the ferrule being shown as cylindrical while the inner end thereof, adjacent the base flange 3, is enlarged to provide a recess 5 that is shown as having a straight top wall 6.

7 is an anchorage element or nut of a size and shape to fit within the recess 5, said element or nut having a flat side 8 for engagement with the straight wall 6 of the recess so as to be effectually held against turning within the recess. The nut or element 7 is provided with a central threaded aperture 9, and with notches 10 that are disposed on opposite sides of the aperture.

12 is a key plate that is reduced in width at one end to substantially the internal diameter of the cylindrical portion of the ferrule 4, while its opposite end is of a width substantially equal to the external diameter of said portion, and, by reason of this design, shoulders 13 occur on the lateral edges of the plate. The inner end of the key plate is forked to provide spaced tongues 14, and the metal throughout the central longitudinal portion of the plate is offset in the form of a bead 15 for a purpose which I shall presently explain.

Prior to attaching the ferrule 4 to the vessel 1, the nut 7 is placed within the recess 5 and the key plate 12 inserted through the cylindrical portion of the ferrule with the tongues 14 engaged through the notches 10 of the nut. Beyond the nut the tongues are turned in opposite directions as shown most clearly in Fig. 4. When the parts are so assembled, the shoulders 13 of the key plate engage the inner ends of notches 16 in the outer end of the ferrule. With the parts thus assembled the key plate is securely held against turning with respect to the ferrule: first, because of the engagement of its enlarged or wider end in the notches 16 of the ferrule, and second, because of its connection with the nut 7 which, in turn, is restrained against angular movement with respect to the ferrule through the cooperation of its flat side 8 with the straight wall 6 of the recess 5, as above explained. With the parts in this condition, the ferrule is attached to the wall of the vessel.

20 is a handle of wood or other suitable material of low heat conductivity. The extremity of the shank end of the handle, such part being designated 21, is of a diameter that will fit within the cylindrical portion of the ferrule 4, while inwardly of the portion 21 it is enlarged in diameter to approximate the external diameter of such cylindrical portion. A bore 23 extends throughout the length of the handle, and the bore is enlarged at 24 adjacent the shank end. Diametrically opposed kerfs 25 open through the end of the handle and extend throughout the portions 21 and 22. The shank end of the handle may be inserted into the cylindrical portion of the ferrule with the sides of the key plate 12 occupying the kerfs 25 and the bead 15 of the plate reposing within the counterbore 24. The outer end of the handle is formed to receive an escutcheon plate 28 that has a central aperture registering with the bore of the handle. A bolt 29 extends through the bore of the handle and is threaded into the anchorage element or nut 7. The outer end of the bolt terminates in an eye 30 which engages the escutcheon plate 28 and by screwing down firmly upon the bolt all parts of the handle are very firmly drawn together. The offset or bead 15 of the key plate 12 is for the accommodation of the bolt where it passes through the counterbore or enlargement 24 of the handle.

Should it be desired to renew the handle or grip 20, upon removal of bolt 29 the old handle may be withdrawn. A substitute handle is then inserted and the bolt replaced as in the original assembly.

From the foregoing description it will be seen that my invention provides a neat appearing handle that is convenient of attachment and wherein the only destructible part is readily replaceable.

Having thus described my invention, what I claim is:

1. In a handle construction of the character set forth, the combination of a ferrule, a grip member having a part fitting within the ferrule, a key plate interengaging parts of said member and ferrule to hold them against relative angular movement, and means for securing the grip member to the ferrule.

2. In a handle construction of the character set forth, the combination with a ferrule, a grip member having a part fitting within the ferrule, a key plate disposed within a transverse kerf of the grip member and projecting into recesses of the ferrule, and means for securing the grip member to the ferrule.

3. In a handle construction of the character set forth, the combination of a ferrule, a grip member having a part fitting within the ferrule, an anchorage element confined within the ferrule against angular movement with respect thereto, a key plate secured to the anchorage element and disposed within a transverse kerf of the grip member and having parts engaged within recesses of the ferrule, and means for securing the grip member to the ferrule.

4. In a handle construction of the character set forth, the combination of a ferrule, a grip member having a part fitting within the ferrule, said member having a longitudinal bore, an anchorage element confined within the ferrule against angular movement with respect thereto, a key secured to the anchorage element and interengaging with parts of the grip member and ferrule for restraining them against relative angular movement, and a bolt extending through the longitudinal bore of the grip member and threaded into the anchorage element.

5. In a handle construction of the character set forth, the combination of a ferrule having a cylindrical shank receiving portion and a non-circular recess into which the cylindrical portion opens, an anchorage element fitting within said recess so as to be restrained thereby against turning, a key plate having a reduced end extending transversely across and fitting within the cylindrical portion of the ferrule and provided with prongs interlocking with the anchorage element, the key plate interengaging at its wider end within diametrically opposed notches of the ferrule, a grip member having a shank portion designed to fit within the cylindrical portion of the ferrule and kerfed to receive the key plate, and means for securing the grip member to the ferrule.

6. In a handle construction of the character set forth, the combination of a ferrule having a cylindrical shank receiving portion and a non-circular recess into which the cylindrical portion opens and which is of greater cross dimension than said cylindrical portion whereby a shoulder is formed, an anchorage element fitting within said recess and bearing against said shoulder, a key plate having connection at one end with the anchorage element and engaging at its other end with the ferrule in such manner as to hold the anchorage element against the aforesaid shoulder, a grip member having a shank portion designed to fit within the cylindrical portion of the ferrule and kerfed to receive the key plate, and means for securing the grip member to the ferrule.

7. In a handle construction of the character set forth, the combination of a ferrule having a cylindrical shank receiving portion and a non-circular recess wherewith the former portion communicates, the outer end of the cylindrical portion of the ferrule having diametrically opposed notches, an anchorage element fitting within the non-circular recess and restrained thereby against turning, a key plate reduced in width at one end and fitting transversely of the shank receiving portion of the ferrule and having the edge portions of its wider end engaged within the notches of the ferrule, the reduced end of the key plate being forked and the aforesaid anchorage element having apertures through which said forks are engaged and turned laterally whereby the ferrule, anchorage element and key plate are bound together, a grip member having a shank designed to fit within the shank receiving portion of the ferrule and kerfed for the accommodation of the key plate, the grip member having a longitudinal bore and a bolt extending through said longitudinal bore and screwed into the threaded aperture of the aforesaid anchorage element whereby the grip member is secured to the ferrule, the central longitudinal portion of the key plate being offset laterally to escape the bolt and the inner end of the grip member being counterbored to accommodate the offset portion of the key plate.

8. In a handle construction of the character set forth, the combination of a ferrule having a shank receiving portion, a grip member having a shank fitting within said portion of the ferrule, the grip member having a longitudinal bore, a bolt extending through said bore, an anchorage element within the ferrule and wherewith the bolt has a screw threaded connection, the ferrule having a shoulder engaged by said anchorage member and against which it is drawn by the action of the bolt, and a key secured to the anchorage element and interengaging portions of the ferrule and grip member to hold said parts against relative angular movement.

In testimony whereof, I hereunto affix my signature.

GEORGE H. KOEHLER.